(12) United States Patent
Barss

(10) Patent No.: US 8,434,840 B2
(45) Date of Patent: *May 7, 2013

(54) MORPHOLOGY-CORRECTED PRINTING

(75) Inventor: Steven H. Barss, Lebanon, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/023,533

(22) Filed: Jan. 31, 2008

(65) Prior Publication Data

US 2008/0158279 A1    Jul. 3, 2008

Related U.S. Application Data

(63) Continuation of application No. 10/792,966, filed on Mar. 4, 2004, now Pat. No. 7,360,853.

(51) Int. Cl.
*B41J 29/38* (2006.01)
*B41J 25/308* (2006.01)

(52) U.S. Cl.
USPC .................................. 347/8; 347/14

(58) Field of Classification Search .................. 347/8, 14
See application file for complete search history.

(56) References Cited

U.S. PATENT DOCUMENTS

| | | |
|---|---|---|
| 5,225,852 A | 7/1993 | Uchida et al. |
| 5,291,227 A | 3/1994 | Suzuki |
| 5,376,957 A | 12/1994 | Gandy et al. |
| 5,456,539 A | 10/1995 | Wright et al. |
| 5,576,744 A | 11/1996 | Niikura et al. |
| 5,717,446 A | 2/1998 | Teumer et al. |
| 5,748,215 A | 5/1998 | Swanson et al. |
| 5,784,171 A | 7/1998 | Kano |
| 5,988,784 A | 11/1999 | Takemura et al. |
| 6,022,104 A | 2/2000 | Lin et al. |
| 6,097,408 A | 8/2000 | Fukushima et al. |
| 6,133,930 A | 10/2000 | Shibuki et al. |
| 6,154,240 A | 11/2000 | Hickman |
| 6,281,909 B1 | 8/2001 | Fassler et al. |
| 6,344,819 B1 | 2/2002 | Pond |
| 6,350,009 B1 | 2/2002 | Freund et al. |
| 6,471,315 B1 | 10/2002 | Kurata |
| 6,536,345 B1 | 3/2003 | Young |
| 6,565,182 B1 | 5/2003 | Fredrickson et al. |
| 6,565,183 B2 | 5/2003 | Goto et al. |
| 6,631,976 B2 | 10/2003 | Hamamoto et al. |

(Continued)

FOREIGN PATENT DOCUMENTS

| | | |
|---|---|---|
| CN | 1781709 | 6/2006 |
| CN | 1997522 A | 11/2007 |

(Continued)

OTHER PUBLICATIONS

European Search Report dated Mar. 26, 2008.

(Continued)

*Primary Examiner* — Julian Huffman
(74) *Attorney, Agent, or Firm* — Fish & Richardson P.C.

(57) ABSTRACT

In general, in one aspect, the invention features a method, including measuring a surface profile of a substrate, generating firing instructions for a droplet ejection device based on the surface profile, and depositing droplets on the substrate with the droplet ejection device according to the instructions.

10 Claims, 2 Drawing Sheets

U.S. PATENT DOCUMENTS

| | | | |
|---|---|---|---|
| 6,666,537 B1 | 12/2003 | Kelley et al. | |
| 6,709,088 B2 | 3/2004 | Hayakawa et al. | |
| 7,128,389 B2 | 10/2006 | Okamoto et al. | |
| 7,270,390 B2 | 9/2007 | Baba et al. | |
| 7,357,481 B2 | 4/2008 | Baker | |
| 7,360,853 B2 * | 4/2008 | Barss | 347/8 |
| 7,524,050 B2 | 4/2009 | Baker et al. | |
| 7,794,046 B2 | 9/2010 | Baker et al. | |
| 7,845,790 B2 | 12/2010 | Baker et al. | |
| 2002/0041303 A1 | 4/2002 | Yoshinaga | |
| 2002/0154202 A1 | 10/2002 | Yamamoto et al. | |
| 2002/0196298 A1 | 12/2002 | Cheng et al. | |
| 2003/0001919 A1 | 1/2003 | Blair | |
| 2003/0151639 A1 | 8/2003 | Takahashi | |
| 2003/0214554 A1 | 11/2003 | Tschida | |
| 2003/0234832 A1 | 12/2003 | Uchida et al. | |
| 2004/0028830 A1 | 2/2004 | Bauer | |
| 2004/0046852 A1 | 3/2004 | Pham et al. | |
| 2004/0056930 A1 | 3/2004 | Tsai et al. | |
| 2004/0095404 A1 | 5/2004 | Iwao et al. | |
| 2004/0109050 A1 | 6/2004 | Yang | |
| 2004/0119777 A1 | 6/2004 | Nakashima et al. | |
| 2004/0228669 A1 | 11/2004 | Nakashima et al. | |
| 2005/0195229 A1 | 9/2005 | Barss | |
| 2005/0200650 A1 | 9/2005 | Inokuchi et al. | |
| 2005/0200680 A1 | 9/2005 | Uchida | |
| 2005/0219290 A1 | 10/2005 | Iwao et al. | |
| 2005/0285894 A1 | 12/2005 | Nakayama | |
| 2006/0050099 A1 | 3/2006 | Murakami et al. | |
| 2006/0132513 A1 | 6/2006 | Ozaki et al. | |
| 2006/0164463 A1 | 7/2006 | Baker | |
| 2006/0164486 A1 | 7/2006 | Baker | |
| 2007/0206038 A1 | 9/2007 | Baker | |
| 2007/0236535 A1 | 10/2007 | Baker et al. | |
| 2007/0236545 A1 | 10/2007 | Baker et al. | |

FOREIGN PATENT DOCUMENTS

| | | |
|---|---|---|
| DE | 4034327 | 4/1992 |
| EP | 1008454 A | 6/2000 |
| EP | 1040930 | 10/2000 |
| EP | 1063095 | 12/2000 |
| EP | 1236580 | 9/2002 |
| EP | 1457347 | 9/2004 |
| EP | 1666259 A | 6/2006 |
| EP | 1732765 | 12/2006 |
| JP | 7-314849 | 12/1995 |
| JP | H8(1996)-90776 | 4/1996 |
| JP | H10(1998)-202161 | 8/1998 |
| JP | H10(1998)-217444 | 8/1998 |
| JP | H11(1999)-240146 | 9/1999 |
| JP | 2000-272111 | 10/2000 |
| JP | 2001-260329 | 9/2001 |
| JP | 2001 277528 | 10/2001 |
| JP | 2001-310458 | 11/2001 |
| JP | 2002-11864 | 1/2002 |
| JP | 2002-248423 | 9/2002 |
| JP | 2004-508220 | 3/2004 |
| KR | 2006-0127248 | 12/2006 |
| WO | WO 97/27759 | 8/1997 |
| WO | 02/18148 | 3/2002 |
| WO | WO 2005/086715 A2 | 9/2005 |
| WO | WO 2006/081481 | 8/2006 |
| WO | WO2006/081485 | 8/2006 |
| WO | WO2007/103735 | 9/2007 |
| WO | WO2007/118181 | 10/2007 |
| WO | WO2007/121195 | 10/2007 |

OTHER PUBLICATIONS

U.S. Appl. No. 10/792,966, Barss, filed Mar. 4, 2004; Pending Claims.
Office Action dated Dec. 5, 2008 received in corresponding Chinese application No. 200580011220.3.
European Search Report received in European Patent Application No. 07757726.0—1251 dated Mar. 31, 2009, 5 pages.
International Search Report and Written Opinion of the International Searching Authority, International Application Serial No. PCT/US2006/003063, Apr. 20, 2007, 5 pp.
International Preliminary Report on Patentability, International Application Serial No. PCT/US2006/003063, Aug. 9, 2007, 5 pp.
International Search Report and Written Opinion of the International Searching Authority, International Application Serial No. PCT/US2006/066117, Nov. 7, 2007, 12 pp.
International Preliminary Report on Patentability, International Application Serial No. PCT/US2007/066117, Oct. 16, 2008, 7 pp.
International Search Report and Written Opinion of the International Searching Authority, International Application Serial No. PCT/US2007/066351, Jan. 4, 2008, 8 pp.
International Preliminary Report on Patentability, International Application Serial No. PCT/US2007/066351, Oct. 23, 2008, 6 pp.
International Search Report and Written Opinion of the International Searching Authority, International Application Serial No. PCT/US2005/007165, May 23, 2006, 17 pp.
International Search Report and Written Opinion of the International Searching Authority, International Application Serial No. PCT/US2007/063079, Jul. 25, 2008, 11 pp.
International Search Report and Written Opinion of the International Searching Authority, International Application Serial No. PCT/US2006/003067, May 14, 2007, 11 pp.
International Preliminary Report on Patentability, International Application Serial No. PCT/US2006/003067, Aug. 9, 2007, 7 pp.
Office Action dated Mar. 13, 2009 received in Chinese application No. 200680004827.3.
Office Action dated Jun. 3, 2009 received in Chinese application No. 2006800048269.
Transaction History for U.S. Appl. No. 11/367,122 (published as US2007/0206038).
Transaction History for U.S. Appl. No. 11/045,962 (published as US2006/0164486).
Pending Claims for U.S. Appl. No. 11/045,962.
Transaction History for U.S. Appl. No. 11/400,444 (published as US2007/0236545).
Pending Claims for U.S. Appl. No. 11/400,444.
International Preliminary Report on Patentability dated Sep. 18, 2008 from co-pending PCT Application No. PCT/US2007/063079.
Office action dated Nov. 2, 2009 from co-pending European Application No. 07757726.0.
Office action dated Jul. 24, 2009 from co-pending Chinese Application No. 200580011220.3.
Office Action dated Jan. 29, 2010 received in Chinese Application 200780021603.8, 16 pages.
Office Action dated Feb. 12, 2010 received in Chinese application No. 200780016007.0, 14 pages.
European Supplementary Search Report received in European application No. 07760419.7, dated Feb. 16, 2010, 3 pages.
Office action dated Feb. 4, 2010 received in European application No. 05724668.8, 4 pgs.
Office action dated Jun. 3, 2009 received in Chinese application No. 200680004826.9.
Office action dated Feb. 5, 2010 received in Chinese application No. 200680004826.9.
Office action dated May 19, 2010 received in Chinese application No. 200680004826.9.
Search Report dated Mar. 3, 2010 received in European Application No. 06719772.3.
Office action dated Dec. 7, 2010 received in Japanese application No. 2007-502034.
Office action dated Feb. 10, 2011 received in European application No. 07760419.7.
Office action dated Dec. 27, 2010 issued in Chinese Application No. 200580011220.3 , 9 pgs.
Office action dated Mar. 13, 2009 received in Chinese application No. 200680004827.3, 10 pgs.
Office action dated Jan. 27, 2011 received in Japanese application No. 2007-553292.
Transaction History for U.S. Appl. No. 11/367,122.
Pending Claims for U.S. Appl. No. 11/367,122.
Office action issued Dec. 20, 2011 in corresponding Korean application No. 10-2006-7020825, 7 pgs.

Office Action from corresponding European Application No. EP 07 757 726.0, dated Nov. 2, 2009, 3 pages.
Office Action from corresponding Chinese Application No. CN 2007800216038, mailed Mar. 4, 2010, 7 pages.
Office Action in Japanese Application 2011-253936, dated Nov. 20, 2012, 6 pages.

Office Action in Chinese Application No. 2005800112203, dated Apr. 6, 2012, 14 pages.

* cited by examiner

MORPHOLOGY-CORRECTED PRINTING

CROSS-REFERENCE TO RELATED APPLICATIONS

This application is a continuation application of and claims the priority of U.S. application Ser. No. 10/792,966, filed on Mar. 4, 2004, now U.S. Pat. No. 7,360,853 the entire content of which is incorporated by reference.

BACKGROUND

In ink jet printing, ink is ejected from a narrow orifice in the direction of a substrate. In one type of ink jet printing, known as drop-on-demand printing, the ink is ejected in a series of drops. The drops may be produced and controlled using a piezoelectric ink jet head that has a large number of orifices (also referred to as nozzles). Each orifice is separately controllable to selectively eject ink at desired locations, or pixels, of the image. For example, an ink jet head may have 256 orifices that have spacing for a printing resolution of at least 100 pixels (dots) per inch (dpi) and sometimes far more than that. This dense array of orifices allows complex, highly accurate images to be produced. In high performance print heads, the nozzle openings typically have a diameter of 50 micrometers or less (e.g., around 25 micrometers), are separated at a pitch of 25-300 nozzles/inch, have a resolution of 100 to 3000 dpi or more, and provide drop sizes of about 2 to 50 nanograms (p1) or less. Drop ejection frequency is typically 10 kHz or more. A drop-on-demand piezoelectric print head is described in U.S. Pat. No. 4,825,227, the entire content of which is incorporated herein by reference.

SUMMARY

In general, in a first aspect, the invention features a method, including measuring a surface profile of a substrate, generating firing instructions for a droplet ejection device based on the surface profile, and depositing droplets on the substrate with the droplet ejection device according to the instructions.

Embodiments of the method can include one or more of the following features and/or features of other aspects. The surface profile can be measured optically. Optically measuring the surface profile can include causing relative motion between the substrate and an array of displacement meters while monitoring the distance between the substrate and the meters at a plurality of locations. The firing instructions can account for variations in the surface profile. For example, the firing instructions can compensate for time of flight variations of the droplets to account for variations in the surface profile. In some embodiments, the firing instructions account for misalignment between the substrate and the droplet ejection device. Measuring the surface profile can include causing relative motion between the substrate and a profiling apparatus. Depositing droplets can include causing relative motion between the substrate and the droplet ejection device. A velocity of the relative motion can be about 1 ms$^{-1}$ or more. The method can further include providing a series of substrates and successively measuring the profile of each substrate and depositing droplets on each substrate. A resolution of the deposited droplets on the substrate can be about 100 dpi or more (e.g., 200 dpi, 300 dpi, 600 dpi or more). The substrate has a stand off variation of about 0.1 mm or more between two points on its surface (e.g., about 0.2 mm, 0.3 mm, 0.5 mm, 1 mm or more). The substrate can be a food product, such as a baked good. The droplet ejection device can be a piezoelectric, drop-on-demand print head.

In general, in another aspect, the invention features an apparatus for depositing droplets on a substrate, including a droplet ejection device, a surface profiler, and an electronic processor in communication with the surface profiler and the droplet ejection device, wherein the surface profiler measures a surface profile of the substrate and the electronic processor generates firing instructions for the droplet ejection device based on the surface profile.

Embodiments of the apparatus can include one or more of the following features and/or features of other aspects. The apparatus can further include a substrate conveyor configured to scan the substrate relative to the surface profiling device and the droplet ejection device. The electronic processor can generate firing instructions based on relative motion between the substrate and droplet ejection device, such that firing instructions or substrate motion are varied depending on surface profile variations. The droplet ejection device can be an ink jet print head (e.g., a piezoelectric, drop-on-demand printhead). The ink jet print head can have a resolution of at least about 100 dpi. The surface profiler can be an optical surface profiler. For example, the surface profiler can include an array of laser displacement meters (e.g., an array of meters configured to measure a distance from the meters to the substrate) or a scanning laser profilometer.

Embodiments of the invention may have one or more of the following advantages: they can reduce drop placement errors when depositing droplets on non-flat substrate surfaces; they can reduce drop placement errors in high throughput applications where the substrates are non-flat; they can reduce errors due to misalignment of a substrate relative to a print head; they can be implemented using commercially available components.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A shows the apparatus along the process direction, while FIG. 2B shows a portion of the apparatus in the cross-web direction.

Like reference symbols in the various drawings indicate like elements.

DETAILED DESCRIPTION

In certain aspects, the invention relates to depositing droplets (e.g., ink jet printing) on non-flat surfaces (e.g., irregular surfaces and/or smoothly curved surfaces).

Figure 1:
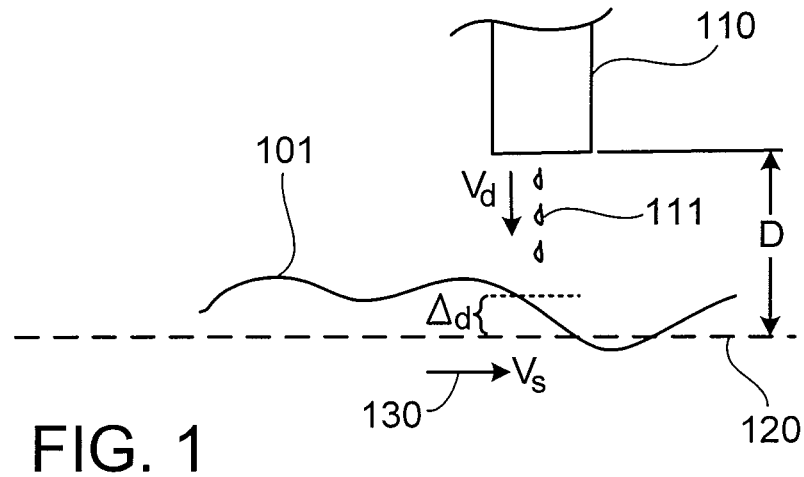
FIG. 1 is a schematic diagram illustrating the effect of time of flight differences when printing on a non-flat substrate.

Referring to FIG. 1, a droplet deposition apparatus 110, such as an ink jet print head, deposits droplets 111 onto an irregular substrate 101, such as a food product (e.g., a baked good such as a cookie), or a food package. During operation, substrate 101 moves relative to apparatus 110 (in a direction shown by arrow 130) as it ejects droplets towards the substrate. In a typical embodiment, substrates are directed to a printing station in succession, and each substrate may have a different morphology that varies randomly. An actual stand off distance between the substrate and the apparatus varies relative to a nominal stand off distance, D, between a nominal substrate location (indicated by line 120) and droplet deposition apparatus 110.

Where a substrate is sufficiently flat and the stand off distance does not deviate substantially from D, the time of flight, TOF, of the droplets is given by $$TOF = \frac{D}{v_d},$$

where $v_d$ is the droplet velocity. Where the droplets are ejected at regular intervals, τ, a distance, x, between adjacent droplets on the substrate is given by $$x = \tau \times v_s,$$

where $v_s$ is the relative velocity between the substrate and the droplet deposition apparatus.

Where the substrate is non-flat, the actual time of flight, $t_{actual}$, is given by $$t_{actual} = \frac{D - \Delta d}{v_d},$$

where Δd is the difference between substrate and the nominal substrate location 120. If uncompensated, time of flight variations resulting from irregularities in the substrate would result in errors in drop placement by an amount Δx, given by $$\Delta x = \Delta t \times v_s = \Delta d \frac{v_s}{v_d},$$

where $\Delta t = t_{actual} - TOF$. In the present embodiment, however, the timing between droplet ejections is adjusted by an amount −Δt to accommodate for the time of flight variations resulting from irregularities in the substrate, reducing (e.g., eliminating) droplet placement errors associated with the time of flight variations.

Figure 2A:
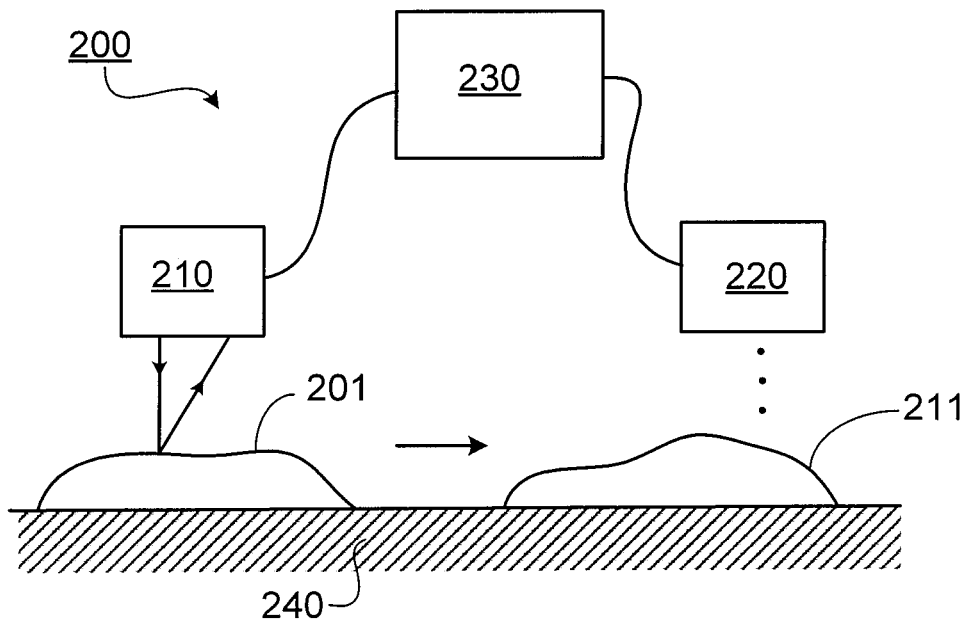
FIGS. 2A and 2B are schematic diagrams of portions of a droplet ejection apparatus for depositing droplets on a non-flat substrate.
Figure 2B:
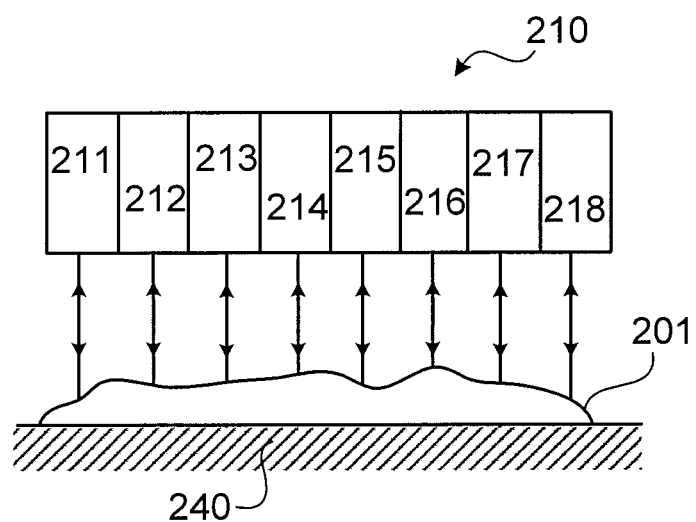

The timing between droplet ejections is adjusted based on a surface profile or morphology of the substrate. In some embodiments, the substrate surface profile can be obtained optically. Referring to FIG. 2A and FIG. 2B, a droplet deposition system 200 includes an array 210 of laser displacement meters. In the present embodiment, array 210 includes eight laser displacement meters 211-218 which measure the distance to different portions of a substrate 201. A conveyor 240 scans substrate 201 beneath array 210. The array spans substrate 201 orthogonal to the direction of relative motion between the substrate and a droplet ejection device 220 (hereinafter referred to as "cross-web" direction). In FIG. 2A, droplet ejection device 220 is shown depositing droplets 215 on another substrate 211, which was previously scanned beneath array 210. Droplet ejection device 220 includes a plurality of nozzles (not shown), which extend in the cross-web direction. In some embodiments, nozzle density, and correspondingly deposited droplet resolution, can be relatively high. For example, in certain applications (e.g., ink jet printing), resolution can be about 100 dots per inch (dpi) or more, such as 300 dpi or more. Deposited droplet resolution in the direction of relative motion between the substrate and a droplet ejection device 220 (hereinafter referred to as "process" direction), depends upon the system's ejection frequency. Process direction resolution can also be relatively high (e.g., about 100 dpi, 300 dpi, 600 dpi or more). In many applications, the process direction resolution is the same as the cross-web resolution.

As substrate 201 moves beneath array 210, each displacement meter measures displacement between the meter and the substrate. To perform these measurements, each displacement meter directs a laser beam to substrate surface 201. Each beam reflects from a different portion of the surface and each reflected beam is detected by a light-receiving element (e.g., a charge coupled device or a position sensitive detector) in the respective displacement meter. Based on the location of the reflected light on the light-receiving element, each displacement meter triangulates the location of the substrate surface from the outgoing and reflected laser beams, providing a value for the displacement of the substrate surface relative to the meter. The displacement meters make a number of displacement measurements as substrate 201 moves beneath them. The measured displacements correspond to the varying stand off distance between droplet ejection device 220 and the substrate. Scanning substrate 201 beneath array 210 thus provides a surface profile of the entire substrate.

Figure 3:
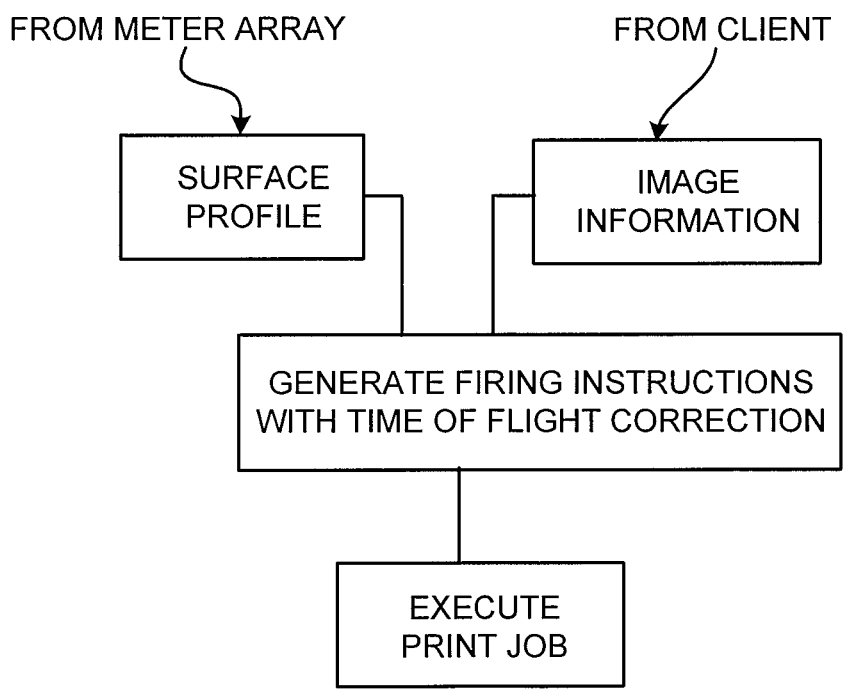
FIG. 3 is a flowchart showing a process for depositing droplets on a non-flat substrate.

Referring to FIG. 3, the surface profile is received by an electronic processor 230 (e.g., a computer), which generates firing instructions for droplet ejection device 220 based thereon. Firing instructions tell droplet ejection device 220 which nozzles to activate each droplet ejection cycle. The droplet ejection cycle is controlled by a signal from an encoder (not shown), which monitors the relative position of the substrate and the droplet ejection device and triggers droplet ejection after a predetermined displacement corresponding to the process direction resolution. Processor 230 generates the firing instruction based on job data received from a client. In printing applications, for example, the job data corresponds to an image. In such applications, the client is typically a computer and the job data is the output of a desktop publishing program. In raster-image-processing (RIP-ing), processor 230 generates firing instructions for the ejection device 220 based on the job data and the surface profile. The firing instructions include information about which nozzles are to be activated each ejection cycle, and also the relative timing offsets (i.e., the Δt's) of each nozzle's activation relative to the encoder signal to compensate for the time of flight variations of the droplets.

In some embodiments, substrate throughput is high. For example, $v_s$ can be about 1 ms⁻ or more (e.g., about 3 ms$^{-1}$, 5 ms$^{-1}$, 8 ms$^{-1}$, 10 ms$^{-1}$ or more). Furthermore, in many applications, $v_d$ is from about 3 ms$^{-1}$ to about 8 ms$^{-1}$. At these velocities, droplet displacement errors can range from about 0.125 and 3.33 millimeters per millimeter of stand off variation. Accordingly, in high resolution applications (e.g., more than about 100 dpi, such as 300 dpi or more), a fraction of a millimeter stand off variation (e.g., 0.1 mm) can result in droplet placement errors comparable to the pixel pitch if uncompensated. To compensate for the time of flight variations for this range of droplet velocities, Δt is between about $1.25 \times 10^{-2}$ and $3.33 \times 10^{-2}$ seconds per millimeter of stand off variation. In embodiments, the substrate is about three inches or more wide in the cross-web direction (e.g., five to ten inches or more wide).

A suitable displacement meter is the LC series Ultra-high Accuracy Displacement Meters from Keyence Corp. (Woodcliff Lake, N.J.). This displacement meter uses a red diode laser (670 μm), which can be focused to a spot size of about 20 micrometers or less. The meter operates at a sampling frequency of 50 kHz. While array 210 has eight displacement meters in the described embodiment, in general, any number of displacement meters can be used. The number of displacement meters can be chosen so that array 210 spans the substrate and provides sufficient resolution for the cross-web surface profile to adequately compensate for surface variations of the substrate. In some embodiments, the number of displacement meters can be the same as the number of nozzles in droplet ejection device 220. However, more commonly, the time of flight variations can be adequately compensated using a lower resolution surface profile than the cross-web droplet resolution. For example, the surface profile resolution can be about 10% or less of the droplet resolution (e.g., 5%, 2%, 1%, 0.5%, 0.1% or less). In order to provide a correction for each nozzle, processor 230 can interpolate the surface profile data to provide an adjusted surface profile with the same resolution as the droplet ejection device. For example, the processor can linearly interpolate the surface profile data from adjacent displacement meters, or can interpolate this data using other functions (e.g., higher order geometric functions).

While the maximum cross-web resolution of array 210 corresponds to the number of displacement meters, array 210 can be operated at lower resolutions. For example, where the average length scale of surface profile variations is significantly larger (e.g., twice as large) than the cross-web resolution, fewer positions on the substrates need be monitored to provide a surface profile from which adequate correction to the firing instructions can be made.

Array 210 can also include rows of displacement meters staggered relative to the process direction. For example, where the physical width of the displacement meters limits the resolution, staggering two or more rows of meters (each offset from each other with respect to the cross-web direction), can provide overall increased array resolution.

Process direction resolution of the surface profile is related to the sampling rate of the displacement meters and the substrate velocity. This resolution can be the same or different than the cross-web resolution, and can be the same or different than the process direction droplet resolution.

A suitable droplet ejection device is an ink jet print head, such as a Galaxy or Nova series print head, commercially available from Spectra, Inc. (Hanover, N.H.). Additional examples of print heads are described in U.S. Patent Application Publication No. US-2004-0004649-A1, entitled "PRINTHEAD," and filed Jul. 3, 2003, and Provisional Patent Application No. 60/510,459, entitled "PRINT HEAD WITH THIN MEMBRANE," filed Oct. 10, 2003, the contents both of which are hereby incorporated by reference in their entirety. In some embodiments, droplet ejection device 220 includes arrays of print heads.

While the described embodiment utilizes laser displacement meters to generate the surface profile, other profiling devices can also be used. For example, a scanning laser inspection system can be used to scan the substrate surface in the cross-web direction before it passes under the droplet ejection device. Examples of commercially available laser inspection systems include ShapeGrabber® AI Series Automated Inspection Systems (from ShapeGrabber® Incorporated, Ottawa, Canada). Another example of a scanning inspection system is a VIVID series scanner, available from Konica Minolta (Minolta USA, Ramsey, N.J.). The scan rate of the inspection system should be sufficiently fast relative to the substrate velocity to provide the desired surface profile resolution. Alternatively, profile measurements can be made offline and processing can be set to accommodate the profile measurement. In embodiments, a profile of an exemplary substrate or average profile from a subset of substrates can be determined and used for generating the firing instructions.

Furthermore, while the described embodiment reduces droplet placement errors by adjusting ejection pulse timing, other compensation modes can also be used. For example, the substrate profile information can be used to adjust the droplet velocity to accommodate surface variations. In most piezoelectric ink jet printheads, for example, droplet velocity varies depending on the voltage of the ejection pulse applied to a piezoelectric actuator (e.g., the higher the voltage, the greater the velocity). Accordingly, where the stand off distance increases due to the substrate profile, a larger ejection pulse voltage can increase the drop velocity by an amount sufficient to keep the droplet time of flight substantially constant.

Alternatively, or additionally, where cross-web substrate variations are negligible compared to variations in the process direction, the stand off distance can be varied to accommodate for the irregular substrate surface. For example, the droplet ejection device and/or conveyor which transports the substrate can be mounted on an actuator that varies their relative position during operation. In this way, a constant time of flight is maintained despite variations in the substrate surface profile.

In some embodiments, the substrates can include edible items, such as solid foods and foams. Examples of printing on edible substrates are described in U.S. patent application Ser. No. 10/761,008, entitled "PRINTING ON EDIBLE SUBSTRATES," filed Jan. 20, 2004, the entire contents of which are hereby incorporated by reference. Other examples of irregular substrates include packaging products, such as for food packaging (e.g., bottles, cans, and irregular food boxes), consumer electronics products, toys (e.g., dolls), and apparel.

Droplet deposition includes non-ink printing applications. For example, the described embodiments can be applied to various manufacturing processes, such as precision delivery of fluids in microelectronics (e.g., solder) and flat panel display fabrication (e.g., organic light emitting diode materials or color filter materials).

The surface profile information can be used to reduce deposition errors related to other substrate inconsistencies in addition to surface irregularities. For example, the substrate profile can be used to compensate for variations in the orientation of the substrate with respect to the droplet ejection device. An example of this is printing a rectangular image on a rectangular substrate. Using the above-described apparatus, substrate misalignments with respect to the print head are detected from the surface profile. Accordingly, the print job data is RIP-ed to accommodate the misalignment and the image is printed with the correct orientation relative to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising measuring a surface profile of a substrate by causing a first relative motion between the substrate and a profiling apparatus, the first relative motion having a velocity of about 1 ms$^{-1}$ or more;

generating firing instructions for a droplet ejection device based on the surface profile; and depositing droplets on the substrate with the droplet ejection device according to the instructions, depositing droplets comprising causing a second relative motion between the substrate and the drop ejection device, wherein the velocity of the second relative motion is about 1 ms$^{-1}$ or more.

2. The method of claim 1, wherein the surface profile is measured optically.

3. The method of claim 2, wherein optically measuring the surface profile comprises causing the first relative motion between the substrate and an array of displacement meters while monitoring the distance between the substrate and the meters at a plurality of locations.

4. The method of claim 1, wherein the firing instructions compensate for time of flight variations of the droplets to account for variations in the surface profile.

5. The method of claim 1, further comprising providing a series of substrates and successively measuring the surface profile of each substrate and depositing droplets on each substrate.

6. The method of claim 1, wherein a resolution of the deposited droplets on the substrate is about 100 dpi or more.

7. The method of claim 1, wherein the substrate has a stand off variation of about 0.1 mm or more between two points on its surface.

8. The method of claim 1, wherein the substrate is a food product.

9. The method of claim 8, wherein the food product is a baked good.

10. The method of claim 1, wherein the droplet ejection device is a piezoelectric, drop on-demand print head.

\* \* \* \* \*

UNITED STATES PATENT AND TRADEMARK OFFICE
CERTIFICATE OF CORRECTION

PATENT NO. : 8,434,840 B2
APPLICATION NO. : 12/023533
DATED : May 7, 2013
INVENTOR(S) : Steven H. Barss Page 1 of 1

It is certified that error appears in the above-identified patent and that said Letters Patent is hereby corrected as shown below:

In the Claims:

At column 6, line 65, delete "$ms^{-1}$or" and replace with -- $ms^{-1}$ or --.

Signed and Sealed this
Thirtieth Day of July, 2013

Teresa Stanek Rea
*Acting Director of the United States Patent and Trademark Office*